UNITED STATES PATENT OFFICE.

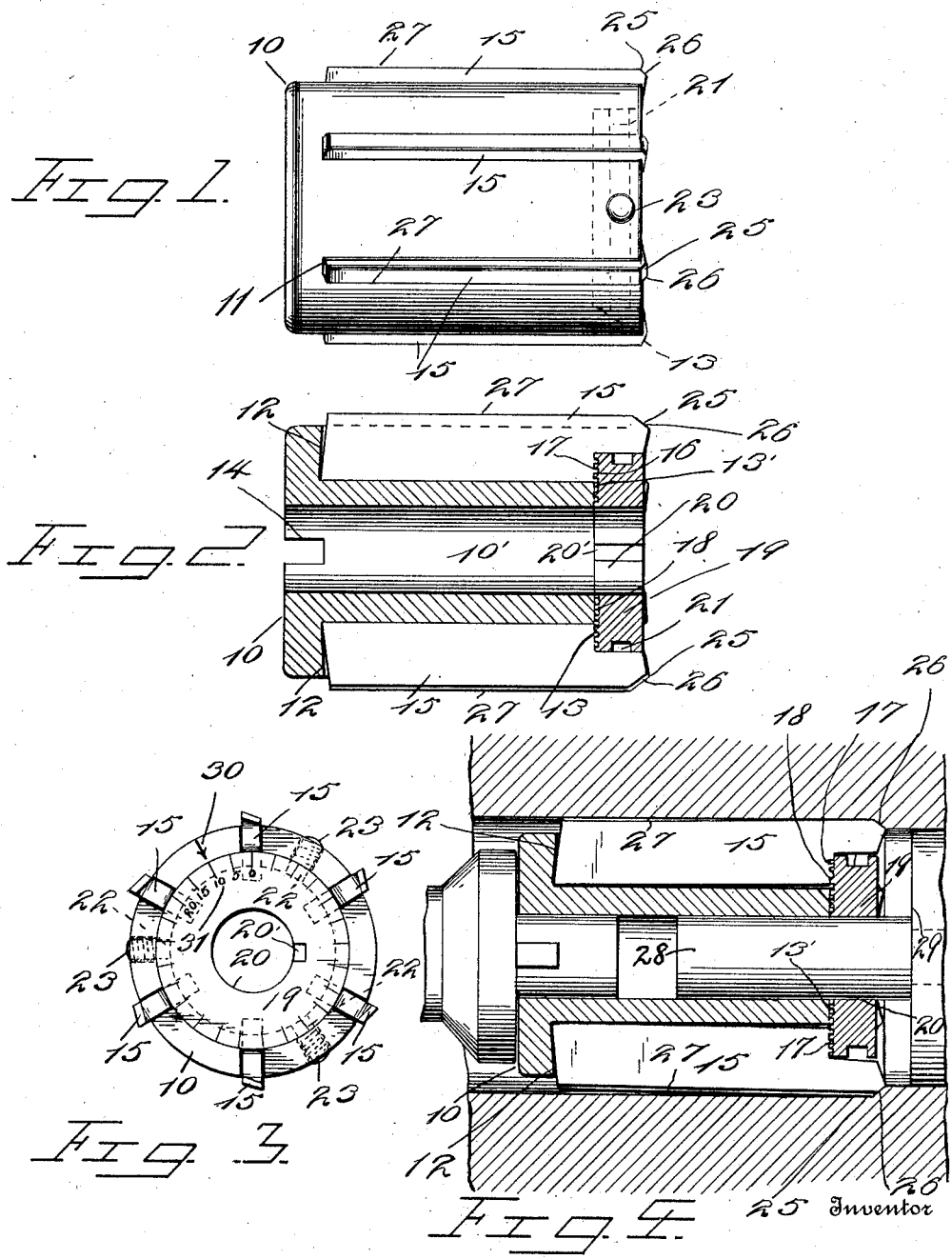

JOHN KAEFER, OF HAMILTON, OHIO.

EXPANDING REAMER.

1,038,384.

Specification of Letters Patent. Patented Sept. 10, 1912.

Application filed April 5, 1911. Serial No. 619,047.

*To all whom it may concern:*

Be it known that I, JOHN KAEFER, a citizen of the United States, residing at Hamilton, in the county of Butler and State of Ohio, have invented new and useful Improvements in Expanding Reamers, of which the following is a specification.

This invention relates to boring tools and the like and more particularly to reamers, and has for its object to provide an expanding reamer which will be simple to manipulate and adjust, which will be simple to manufacture, and low in cost.

It is also an important object to provide an expanding reamer which is readily usable as a micrometer gage for reaching fine adjustments of the cutting portions of the device to cut openings of various sizes.

While it is appreciated that devices attaining similar objects have been provided, their construction generally is more expensive than that of the present invention, which comprises but three primary elements aside from a set screw holding the elements in fixed position.

It is an important desideratum in such devices to have them constructed so that an opening or bore may be reamed flush to an abutment or terminal wall, and it is therefore an important object to provide a radial adjustment means which will not project beyond the cutting portions.

A further object is to so construct and mount the cutting means that liability of its binding to prevent withdrawal from a bore is obviated.

Another important object is to provide a cutter carrier and adjusting means for the cutters which present a clear axial passage for the insertion of a supporting shaft if needs be, to insure operation of the device on a true axis, as in reaming an opening, such devices, if not very rigidly supported, may cut more deeply on one side than on another, the deflection producing a bore of irregular form or eccentric to its proper axis. Where such a device is supported a considerable distance from its cutting portion, as when provided only with a shank for engagement in the stock of a lathe, such deflection is imminent. This device may be mounted in that manner when desired, however.

Other objects and advantages will be apparent from the following description, and from the drawings, in which, Figure 1 is a side view of the device, Fig. 2 is a longitudinal sectional view of the device, Fig. 3 is an end view thereof, Fig. 4 is a similar view to Fig. 1 showing the reamer in operation in expanded position.

Referring to the drawings, there is shown a reamer comprising the body 10, cylindrical in shape, with a plurality of longitudinally extending blade receiving channels 11 formed therein having parallel sides and opening through the forward end of the body, the inner ends of the channels terminating in an overhanging inclined wall 12. The body 10 is provided at its forward end with the circular concentric recess 13, the channels 11 being of such depth that their bottoms lie a considerable distance within the boundary of the recess, and consequently open through the inner wall of the recess. The opposite or rear end of the body is provided with a suitable slot 14 milled or otherwise formed thereacross for the reception of a key portion of a driving member of a suitable type, which may be engaged with the reamer.

Set slidably in the channels 11 there are reamer blades 15, their inner ends being inclined forwardly from their inner to their outer edges more acutely than the wall 12 is disposed with respect to the bottoms of the channels. The forward ends of the blades extend to or slightly beyond the end of the body 10 and are cut away in conformity with the boundary of the recess, but only to such depth as to leave a shoulder 16 projecting through the inner vertical face 13' of the recess, as shown, the shoulder being provided with transverse segmental threads 17 eccentric to the axis of the reamer and meshing with the volute or scroll thread 18 formed on the inner face of an expanding ring 19 set revolubly in the recess 13. The opening 20 through the ring is the same diameter as the bore 10' of the body 10. The ring is provided with the peripheral encircling channel 21, into which project the tenons 22 of retaining and locking screws 23, engaged through the body 10 intermediately of the channels 11. The opening 20 in the ring is provided with the recess 20' to receive a suitable key member which may be inserted therein for turning the ring. The blades 15 have the diagonal portions 25 at their forward ends, having the salient cutting edges 26 formed thereon by transversely beveling the diagonal portions. The outer longitudinal edges of the blades are also beveled, forming the longitudinal cutting edge 27. The edges 26 being within the path of the reamer, will facilitate its operation and allow its ready forward progress into work being reamed. It will be seen that rotation of the ring 19 in one direction will move the forward ends of all the blades outward, while reverse movement will draw them inward. By the beveling of the inner ends of the blades more than the wall 12 of the slots is inclined, the blades are at all times firmly seated against this wall during the radial adjustment of their forward ends. By the disposition of the ring 19 in the recess 13 nothing projects beyond the cutting portions of the blades, so that they may be carried directly against the terminal wall of a bore or against a shoulder therein.

As shown in Fig. 4, if reaming is to be done at a considerable depth in the work, a rest shaft 28 may be projected through the body 10 from the driving member, or may be simply projected partly into the forward end of the reamer, and supported on a suitable carriage 29 traveling on the original bore of the work and holding the reamer positively in proper axial position. A pointer 30 may be marked on the forward end surface of the body 10, and a suitable scale 31 formed on the outer face of the ring, whereby the diameter of the cutting circle, or the degree of movement of the blades may be indicated.

It may be noted that the overhanging inner ends of the slots of the body 10, and the expanding element 19 coöperate at all times to hold the blades securely against outward movement. Thus the blades are not liable to displacement after adjustment, or while being withdrawn from a piece of work. There is also obviated the likelihood of the rear ends of the blades becoming lifted into engagement with the sides of a bore where they might catch or become wedged and prevent withdrawal of the reamer without damage.

What is claimed is:

1. A reamer or the like comprising a body member having a circular recess at its forward end, a plurality of radially movable blades carried thereby having segmentally threaded portions projecting into the recess and cutting portions projecting past the recess, and a member revoluble within the recess and within the ends of the cutting portions and having a scroll thread meshed with the threaded portions of the blades for radial movement of the blades upon rotation of the revoluble member.

2. A device of the class described comprising a body member having a circular recess at its forward end and having longitudinal channels opening into the recess, blades radially slidable in the channels and having portions projecting into the recess, said portions having segmental threads thereon eccentric to the axis of the reamer, an expanding member revoluble in the recess and having a scroll thread meshed with those on the blades, said expanding member having an encircling channel therearound, and retaining members projected thereinto from the body member.

3. A device of the class described comprising a body member having an enlarged bore therethrough, a circular recess at its forward end and longitudinal channels opening into the recess, blades radially slidable in the channels, and having portions projected into the recess and segmentally threaded eccentrically of the axis of the device, an annulus revoluble in the recess within the ends of the blades and having a scroll thread meshed with those on the blades, the opening through the annulus corresponding in size to that of the bore of the body member, and retaining means co-engaged between the annulus and the body member.

4. A device of the class described comprising a body member, having a circular recess at its forward end, radially movable blades carried thereby, said blades projecting beyond the recess and having segmentally threaded shoulders spaced inwardly of their forward ends and projecting into the recess, an expanding member revoluble in the recess and having scroll thread meshed with those of the blades, said expanding member lying within the forward ends of the blades, and having an encircling channel therearound, and members projected into the channel from the body member.

In testimony whereof I have hereunto set my hand in presence of two subscribing witnesses.

JOHN KAEFER.

Witnesses:
J. A. KELLY,
THOS. E. WESCO.

---

Copies of this patent may be obtained for five cents each, by addressing the "Commissioner of Patents, Washington, D. C."